(12) United States Patent
Van Aken et al.

(10) Patent No.: US 9,774,470 B2
(45) Date of Patent: Sep. 26, 2017

(54) DEVICE AND METHOD FOR MANAGING TWO TYPES OF DEVICES

(75) Inventors: Dirk Van Aken, Ganshoren (BE); Roeland Van Den Broeck, Schilde (BE); Sylvain Dumet, Merchtem (BE); Hans Dedecker, Lichtervelde (BE)

(73) Assignee: THOMSON LICENSING DTV, Issy-les-Moulineaux (FR)

( * ) Notice: Subject to any disclaimer, the term of this patent is extended or adjusted under 35 U.S.C. 154(b) by 1240 days.

(21) Appl. No.: 11/922,440

(22) PCT Filed: Apr. 20, 2006

(86) PCT No.: PCT/EP2006/061702
§ 371 (c)(1),
(2), (4) Date: Apr. 8, 2009

(87) PCT Pub. No.: WO2006/136465
PCT Pub. Date: Dec. 28, 2006

(65) Prior Publication Data
US 2009/0222590 A1  Sep. 3, 2009

(30) Foreign Application Priority Data
Jun. 20, 2005 (EP) .................................... 05447142

(51) Int. Cl.
*H04L 12/28* (2006.01)
*H04L 12/46* (2006.01)
*H04L 29/12* (2006.01)

(52) U.S. Cl.
CPC ...... *H04L 12/2898* (2013.01); *H04L 12/2801* (2013.01); *H04L 12/46* (2013.01);
(Continued)

(58) Field of Classification Search
CPC ... H04L 29/08; H04L 49/351; H04L 41/0893; H04L 12/2801; H04L 12/2898; H04L 12/46; H04L 12/4641
(Continued)

(56) References Cited

U.S. PATENT DOCUMENTS 5,432,907 A * 7/1995 Picazo, Jr. .............. H04L 12/44
370/401
6,058,421 A   5/2000 Fijolek et al.
(Continued)

FOREIGN PATENT DOCUMENTS

CN        1267984       9/2000
CN        1505886       6/2004
(Continued)

OTHER PUBLICATIONS

Deutsche Telekom: "T-Sinus 130 DSL Bedienungsanleitung" (On Line), May 2003, XP002342192, pp. 1-70.
(Continued)

*Primary Examiner* — Linglan Edwards
(74) *Attorney, Agent, or Firm* — Tuntunjian & Bitetto, P.C.

(57) ABSTRACT

The present invention concerns an Interconnect device, comprising a first interface to a first network, a second interface to a second network, a bridge for connecting said first interface to said second interface, a router comprising routing means, and a local server. The interconnect device comprises means for detecting a device located on the first network which is able to communicate with a device located on said second network, and means for classifying the device as being a device of a first type or a device of a second type, The interconnect device comprises means for using the routing means for the first type device, and not using the routing means for the second type device.

12 Claims, 2 Drawing Sheets

(52) U.S. Cl.
CPC .... *H04L 12/4641* (2013.01); *H04L 29/12216* (2013.01); *H04L 61/2007* (2013.01)

(58) Field of Classification Search
USPC .......................................................... 709/249
See application file for complete search history.

(56) References Cited

U.S. PATENT DOCUMENTS

| | | | | |
|---|---|---|---|---|
| 6,061,728 | A * | 5/2000 | Mead .................... | H04L 12/462 709/227 |
| 6,289,388 | B1 * | 9/2001 | Disney .................... | H04L 69/16 370/401 |
| 6,343,330 | B1 * | 1/2002 | Khanna ............... | H04L 12/4625 370/401 |
| 6,442,610 | B1 * | 8/2002 | Khanna ................... | H04L 45/00 370/229 |
| 6,496,862 | B1 * | 12/2002 | Akatsu .................... | H04L 12/26 709/223 |
| 7,191,232 | B2 * | 3/2007 | Rigori ..................... | H04L 29/06 709/219 |
| 7,200,679 | B2 * | 4/2007 | Landfeldt ............... | H04L 29/06 709/219 |
| 7,290,050 | B1 * | 10/2007 | Smith ................. | H04L 67/1008 709/224 |
| 7,356,841 | B2 * | 4/2008 | Wilson et al. ................... | 726/15 |
| 2001/0034759 | A1 * | 10/2001 | Chiles et al. ................. | 709/203 |
| 2002/0141352 | A1 | 10/2002 | Fangman et al. | |
| 2003/0039240 | A1 * | 2/2003 | Sutanto ........................ | 370/352 |
| 2003/0204598 | A1 | 10/2003 | Bifano et al. | |
| 2004/0049671 | A1 | 3/2004 | Miyamoto et al. | |
| 2004/0151290 | A1 * | 8/2004 | Magarasevic et al. .... | 379/93.05 |
| 2004/0153556 | A1 * | 8/2004 | Claes et al. ................... | 709/229 |
| 2004/0249906 | A1 | 12/2004 | Olbricht et al. | |
| 2004/0252722 | A1 * | 12/2004 | Wybenga et al. ............. | 370/474 |
| 2005/0207380 | A1 * | 9/2005 | Blasco Claret et al. ...... | 370/338 |
| 2006/0002311 | A1 * | 1/2006 | Iwanaga et al. .............. | 370/254 |
| 2006/0050681 | A1 * | 3/2006 | Monteiro ............ | H04L 12/4645 370/352 |

FOREIGN PATENT DOCUMENTS

| | | |
|---|---|---|
| EP | 1001584 | 5/2000 |
| EP | 0862826 | 4/2002 |
| JP | 03191634 A | 8/1991 |
| JP | 05022293 A | 1/1993 |
| JP | 10056474 A | 2/1998 |
| JP | 2003174482 A | 6/2003 |
| JP | KR1020030054979 | 7/2003 |
| JP | 2003309590 | 10/2003 |
| JP | 2004135147 | 4/2004 |
| JP | 2004235722 A | 8/2004 |
| WO | WO02089417 | 11/2002 |

OTHER PUBLICATIONS

T. Saito et al.: "Home Gateway Architecture and its Implementation" IEEE Transactions on Comsumer Electronics, IEEE Inc. New York US, vol. 46, No. 4, Nov. 2000, pp. 1161-1166.
Search Report Dated May 29, 2006.
Alexander, et al. "DHCP Options and BOOTP Vendor Extensions", Silicon Graphics, Inc., Bucknell University, Mar. 1997, 29 Pages.
Stump, et al., "The User Class Option for DHCP", Pacific Broadband Communications, Northstream AB, Nov. 2000, 29 Pages.

* cited by examiner

DEVICE AND METHOD FOR MANAGING TWO TYPES OF DEVICES

This application claims the benefit, under 35 U.S.C. §365 of International Application PCT/EP2006/061702, filed Apr. 20, 2006, which was published in accordance with PCT Article 21(2) on Dec. 28, 2006 in English and which claims the benefit of European patent application No. 05447142.0, filed on Jun. 20, 2005.

The present invention relates to an interconnect device and a method for managing several types of devices.

A residential gateway, noted RG, permits to connect several devices in a residential network to the Internet network. A typical RG contains interfaces to the residential network such as one or more Ethernet ports and/or one or more WLAN ports.

A first set of device that are connected to the RG are Internet devices that are connected to the Internet.

A video device such as a set-top box can also be connected to the RG. It receives video carried over IP coming from the DSL network. The set-top box may have a behavior different from the standard Internet device: it does not receive an IP address form the local DHCP server of the RG, but it is allocated an IP address from a remote DHCP server of the video domain that may be located close to the video server on the Internet. The video device may also receive specific files at initialization, such as a boot file from the remote server.

Video traffic between the set-top box, noted STB, and the video server is then transparently handled by the RG, using bridging functions.

Therefore, as the STB is different from the first set of device, it is usually plugged to a specific port of the RG. This port can not be used by another device, as it is reserved to the video domain.

Although this configuration fulfils the connectivity requirements, it impacts the ease of use for the end-user. End-user must take care of connecting the STB to the correct port of the RG in order to have access to the video network. The number of specific devices is also limited to the number of specific port for such devices.

The present invention concerns an interconnect device that permits to connect a video device on any port of the interconnect device. To this end, the invention relates to an Interconnect device comprising a first interface to a first network, a second interface to a second network, a bridge for connecting the first interface to the second interface, a router comprising routing means, and a local server characterized in that it comprises means for detecting a device located on the first network, that is able to communicate with a device located on said second network, and means for classifying the device as being a device of a first type or a device of a second type, the interconnect device using the routing means for the first type device, and not using the routing means for the second type device.

Advantageously the local server comprises means for dynamically configuring the bridge after detection of the first type device and/or the second type device on the first network. It indicates to the bridge the means to differentiate between first class device and second class device.

According to an embodiment, the bridge is intended to forward the traffic received from the first type device to the router, and the traffic received from the second type device to the second network.

Preferably, the bridge assigns the traffic from the first type device to a first type Virtual LAN, noted VLAN, and the traffic from the second type device to a second type VLAN.

Advantageously, the bridge contains means for identifying the device type that is source of a traffic received from the first interface. It may identify the device type with an identifier in the packet received, which is for example the source MAC address of the packet.

According to an embodiment, the local server contains means for identifying the device with a code received from the device. Advantageously the code may be contained inside a DHCP DISCOVER sent by the device. When such a device connect to a network, it preliminary broadcasts a DHCP DISCOVER packet to receive an initialization file and/or an IP address. The local has the capability to receive the DHCP DISCOVER packet in order to identify the new devices, and to forward them their IP address.

The code may be a user class ID option or a vendor class ID option that clearly designate the device, and may be easily identified by the local server.

According to an embodiment, the local server comprises means for initializing the first type device, and means for letting a remote server located on the second network initialize the second type device. The device initialization comprises the allocation of an IP address, and the sending of a file at the initialization of the device, such as a boot file.

Preferably, the local server further comprises means for not responding to the DHCP DISCOVER received from the second type device. As it does not receive any response to the DHCP DISCOVER it sent, the second type device sends again a DHCP DISCOVER packet. As the bridge has been configured accordingly, the second DHCP DISCOVER packet is then not sent to the local server, but forwarded to the remote server.

Another object of the invention is a method in an interconnect device, comprising a first interface to a first network and a second interface to a second network, a bridge for connecting the first interface to the second interface, and a router comprising routing means, characterized in that the method comprises following steps:

detecting a device located on the first network that is able to communicate with a device located on said second network, classifying the device as being a device of a first type or a device of second type, for the first type device, using the routing means, for the second type device, not using the routing means.

The invention will be better understood and illustrated by means of the following embodiment and execution examples, in no way restrictive, with reference to the appended figures among which:

Figure 1:
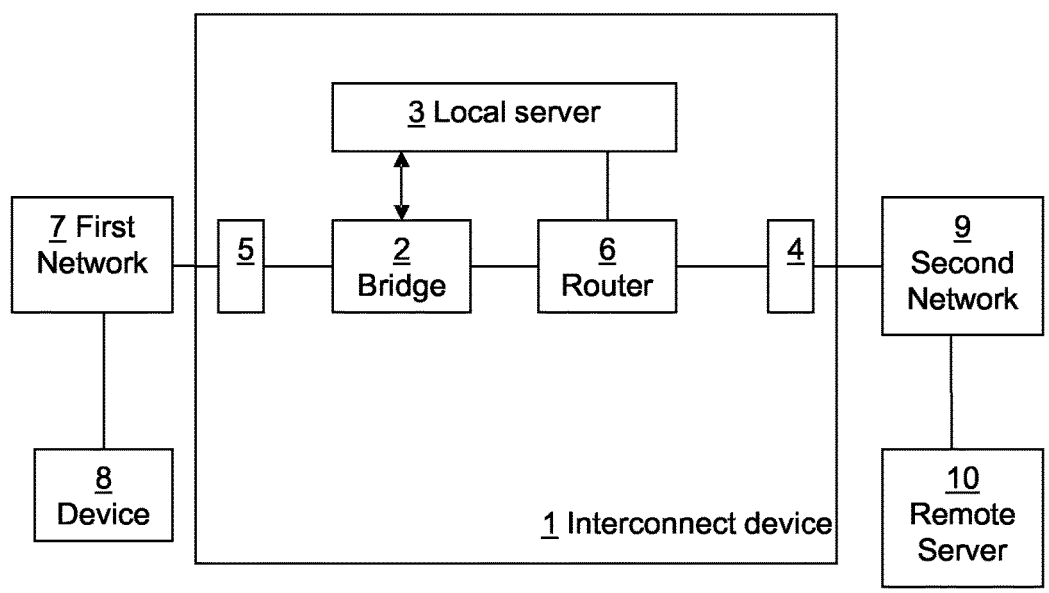
FIG. 1 is a block diagram of an interface device compliant with the invention.

An interconnect device 1, represented in FIG. 1, is a residential gateway and is noted RG in the following description. It comprises an interface 5 to a first network 7. The interface 5 could be one or several Ethernet ports, USB ports, and/or WLAN ports such as Wi-Fi or Bluetooth. It comprises an interface 4 to a second network 9 that might be the Internet network accessible through a DSL. It comprises a bridge 2 for bridging the traffic between the first network 7, the RG and the second network 9. It comprises a router 6 for routing the traffic between the first network 7, the RG and the second network 9. It also comprises a local server 3 that might be a DHCP server.

A device 8 may be connected to the RG through various means. It may be directly connected to the interface 5, or being in the network 7 that is attached to the interface 5. The interface 5 may be an Ethernet interface. The device can then be connected to the Ethernet interface, or connected to a hub connected to the Ethernet interface of the RG.

When connected to the RG, the device 8 broadcasts a DHCP DISCOVER packet, received by the RG, in order to receive an IP address and other possible initialization file such as a boot file.

The RG comprises a local server 3 that receives the DHCP DISCOVER packet. The local server 3 then automatically classifies the device 8 as a first type device or a second type device. To identify the type of each device, the local server 3 reads the DHCP options received in the DHCP DISCOVER packet. It may be the user class ID with the code 77 as described in RFC3004 or the vendor class ID with the code 60 as described in RFC2132. User class option is used by a DHCP client to identify a type or category of user or applications. Vendor class option is used by a DHCP client to identify the vendor type and configuration of a DHCP client. The local server 3 maintains a list of devices that belong to the second type. All devices by default belong to the first type. The list update is part of the initialization configuration of the server, which can be part of the initialization configuration of the RG.

In another configuration the local server 3 might be not comprised in the RG, but located in another device. This would require the server to have access to the configuration of the bridge located in the RG.

The bridge 2 is a VLAN bridge: each device 8 attached to the bridge is assigned to a VLAN. Devices connected to the bridge 2 through a shared hub may be individually assigned to a VLAN. VLAN are assigned dynamically depending on the device that is attached to the first interface 5 of the RG. By default all devices attached to the bridge are assigned to the same VLAN, the first VLAN.

If the new device 8 is a first type device, the server 3 sends an IP address to the new device. It may also send specific files depending on the initialization of the configuration of the device.

If the new device 8 is a second type device, the server 3 launches a script to configure the bridge 2. It indicates to the bridge 2 that this device is assigned to a VLAN different from the first type VLAN, the second type VLAN. Second type VLAN can be for example a video VLAN, the second type device being a set-top box, STB.

Then, when the bridge 2 receives a frame with the source MAC address of the STB, it assigns the frame to the second type VLAN.

Functionally, the VLAN bridge 2 is split into two bridges: the one corresponding to the first type VLAN and the one corresponding to the second type VLAN. They have different behavior: the first bridge acts as a bridge in the RG. The second bridge bypasses the router and is directly connected to the second interface 4 of the RG.

The server 10 of the second type VLAN is located remotely. It is different from the local server 3 of the RG. The second type VLAN traffic is forwarded to this remote server 10.

The local server 3 does not answer to the DHCP DISCOVER packet received from the second type device. As the second type device does not receive a reply to the DHCP DISCOVER packet, it broadcasts a DHCP DISCOVER packet again. As the frame received from the second type device is identified as a second type device by the bridge, it is assigned to the second type VLAN. The DHCP DISCOVER packet is then not sent to the local server 3. It is sent directly to the remote server 10. The way it is sent to the remote server 10 is compliant with the VLAN. The bridge 2 assigns a second type device VLAN, which passes transparently through the router 6 to the second network 9.

The second type device receives then an IP address, and some file such as the boot file, from the remote server 10.

Figure 2:
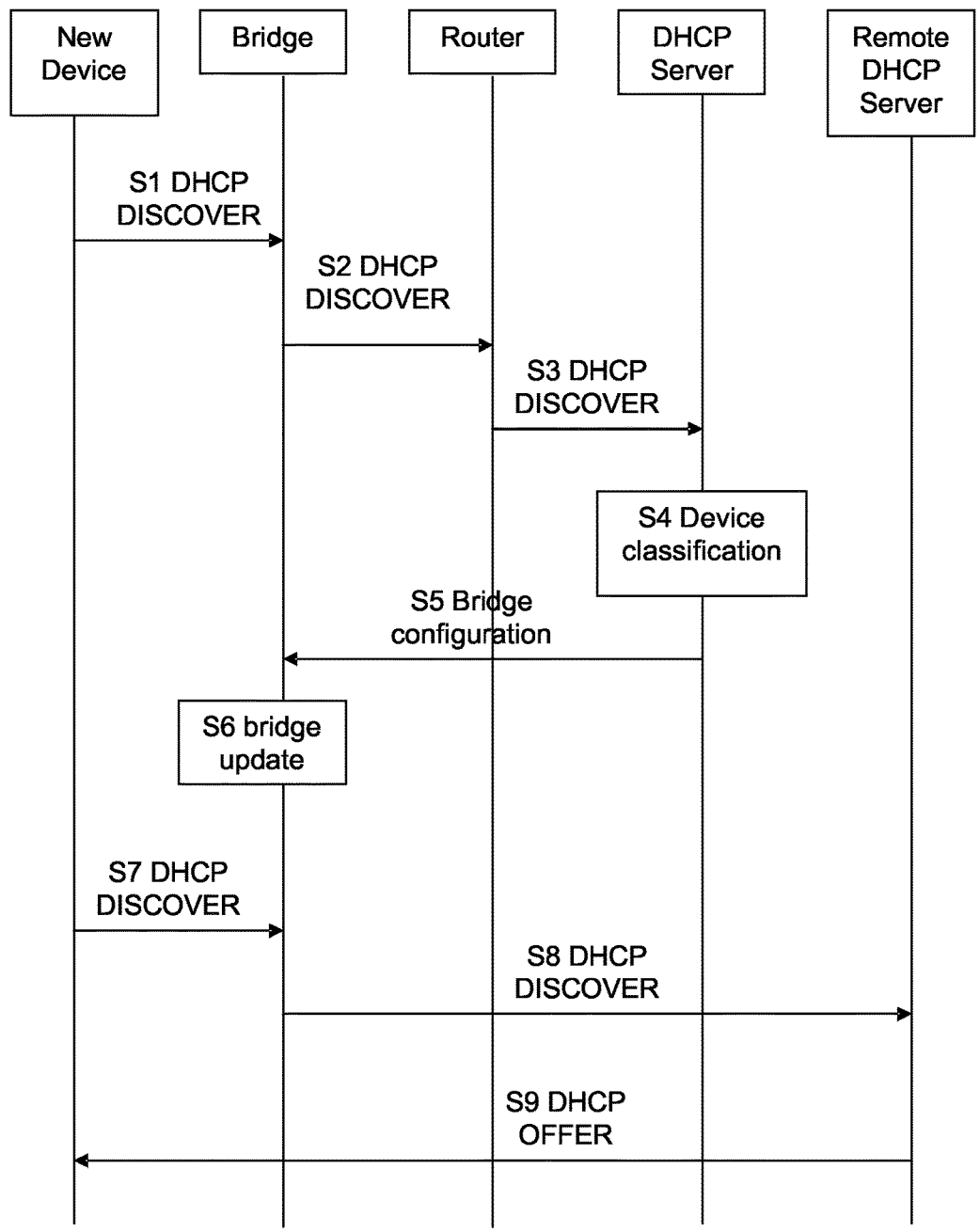
FIG. 2 represents a flow chart that shows the different steps between the modules involved in the process of connecting the new device to the residential gateway RG.

A scenario based on the example above is developed in details in FIG. 2. The modules involved are a new device, a bridge, a router, a local DHCP server and a remote DHCP server.

The method of connecting the device is represented into the following steps:

Step 1. The new device is connected to one interface of the RG. It can also be connected to a hub that has been connected to one interface of the RG. This can also be a WLAN client of a WLAN. When connected, the new device broadcasts a DHCP DISCOVER packet.

Step 2. The bridge in the RG receives the DHCP DISCOVER packet from the new device. It is configured by default to assign all frames to the first VLAN, and it forwards the DHCP DISCOVER packet to the router in the RG.

Step 3. The router in the RG forwards the DHCP DISCOVER packet to the local DHCP server in the RG.

Step 4. The local DHCP server watches the DHCP DISCOVER packet options, the user class ID or vendor class ID, and compares them to the pre registered list of identifier.

Step 5. As the identifier of the new device matches the identifier of the list, the local DHCP server does not send a DHCP OFFER packet to the new device. It sends a configuration script to the bridge. The script contains the MAC address of the new device, and the fact that the device is a second type device.

Step 6. The bridge receives the configuration script and is updated in order that all frames coming from the new device, identified by its MAC address, will be assigned to the second VLAN.

Step 7. As the new device has not received any DHCP OFFER packet, it broadcasts again a DHCP DISCOVER packet.

Step 8. The bridge in the RG receives the DHCP DISCOVER packet from the new device. As the source MAC address of the received frame matches one of the MAC addresses of the second type device, the bridge assigns the frame to the second VLAN. The DHCP DISCOVER packet passes then through the router and is sent to the remote DHCP server.

Step 9. After reception of the DHCP DISCOVER packet, the remote DHCP server sends a DHCP OFFER packet to the new device. And the DHCP process goes on between the remote DHCP server and the new device.

The scenario presents two VLAN, a local and a remote server. The same scenario is also applicable to more than two VLAN and more than one remote server.

The invention claimed is:

1. An interconnecting device, comprising
a first interface configured to connect to a first network,
a second interface configured to connect to a second network,
a local server configured to detect a device located on said first network, and to identify whether said device is a first type device or a second type device,
a router configured to route traffic from the first network to the second network, and
a bridge for connecting said first interface to said second interface configured to transparently pass only frames from second type devices through the router to a remote server connected to the second network, wherein the local server is further configured to initialize said device and to configure said bridge to assign said device to a first Virtual Local Area Network (VLAN) such that frames from said device are forwarded to the router, in the case where said device is identified as a first type device; and wherein the local server is further configured to assign said device to a second VLAN without initializing said device, and to configure said bridge so that frames from said device are transmitted on said second VLAN to pass transparently through the router to a remote server connected to the second network, in the case where said device is identified as a second type device, said remote server initializing said second type device.

2. The interconnecting device according to claim 1, wherein a list of identifiers of second type devices is maintained such that, a detected device having an identifier in the list is identified as a second type device.

3. The interconnecting device according to claim 2, wherein said local server is configured to receive a packet from said device, and to identify whether a field of said packet is comprised in said list.

4. The interconnecting device according to claim 3, wherein said field comprises a user class ID option or a vendor class ID option.

5. The interconnecting device according to claim 1, wherein the local server is configured to detect said device by reception of a DHCP DISCOVER packet from said device.

6. A method in an interconnect device, connecting a first network to a second network via a bridge embedded in said interconnect device, said method comprising:

detecting a device located on said first network and identifying whether said device is first type device or a second type device, and in the case where said device is identified as a first type device, initializing said first type device to communicate with the second network through a router embedded in said interconnect device, and in the case where said device is identified as a second type device, assigning said second type device to a Virtual Local Area Network (VLAN) without initializing said second type device and configuring said bridge so that only frames transmitted from said second device pass transparently through the router to a remote server connected to the second network, said remote server initializing said second type device.

7. The method according to claim 6, wherein said detection is performed by reading a received DHCP DISCOVER packet.

8. The method according to claim 6, further comprising after the assigning of said second type device to a second VLAN, receiving a subsequent request from said second type device, and forwarding the DHCP DISCOVER to said second network.

9. An interconnecting device, comprising:

a first interface to a first network, a second interface to a second network, a local server configured to detect a device located on said first network, and to identify whether said device is a first type device or a second type device based on a received DHCP DISCOVER packet, and on reception of a DHCP DISCOVER packet from a first type device, to initialize said first type device by sending a DHCP OFFER packet to said first type device, a router configured to route traffic from the first network to the second network, and a bridge for connecting said first interface to said second interface configured to transparently pass only frames from second type devices through the router to a remote server connected to the second network, wherein said local server is further configured to, on reception of a DHCP DISCOVER packet from a second type device, assign said second type device to a Virtual Local Area Network (VLAN), to not send a DHCP OFFER packet to said second type device in response to the reception of the DHCP DISCOVER packet, and to configure said bridge so that frames from said second type device bypass the router to a remote server connected to the second network, so that on reception of another DHCP DISCOVER packet from said second type device, said DHCP DISCOVER packet is sent to said remote server connected to said second network, said remote server initializing said second type device.

10. The interconnecting device according to claim 9, wherein a list of identifiers of second type devices is maintained such that a detected device having an identifier in the list is identified as a second type device.

11. The interconnecting device according to claim 9, wherein said local server is configured to receive a packet from said device, and to identify whether a field of said packet is comprised in said list.

12. The interconnecting device according to claim 11, wherein said field comprises a user class ID option or a vendor class ID option.

* * * * *